United States Patent [19]

Case et al.

[11] Patent Number: 5,734,890
[45] Date of Patent: Mar. 31, 1998

[54] SYSTEM AND METHOD FOR ANALYZING PROCUREMENT DECISIONS AND CUSTOMER SATISFACTION

[75] Inventors: Richard H. Case, Danville; David Stein, San Jose, both of Calif.

[73] Assignee: Gartner Group, Santa Clara, Calif.

[21] Appl. No.: 518,065

[22] Filed: Aug. 22, 1995

Related U.S. Application Data

[63] Continuation-in-part of Ser. No. 305,105, Sep. 12, 1994.

[51] Int. Cl.$^6$ ..................................................... G06F 17/30
[52] U.S. Cl. ................................................ 395/605; 395/606
[58] Field of Search ........................................ 364/401, 419; 395/605, 606

[56] References Cited

U.S. PATENT DOCUMENTS

| | | | |
|---|---|---|---|
| T998,008 | 9/1980 | DeLano, Jr. | 364/412 |
| 4,775,935 | 10/1988 | Yourick | 364/401 |
| 4,829,426 | 5/1989 | Burt | 364/300 |
| 4,996,642 | 2/1991 | Hey | 364/419 |
| 5,041,972 | 8/1991 | Frost | 364/401 |
| 5,124,911 | 6/1992 | Sack | 364/401 |
| 5,182,793 | 1/1993 | Alexander et al. | 395/13 |
| 5,241,624 | 8/1993 | Torres | 395/129 |
| 5,267,148 | 11/1993 | Kosaka et al. | 364/408 |
| 5,406,477 | 4/1995 | Harhen | 364/401 |
| 5,587,935 | 12/1996 | Brooks et al. | 364/505 |
| 5,625,751 | 4/1997 | Brandwajn et al. | 395/22 |
| 5,649,116 | 7/1997 | McCoy et al. | 395/238 |

OTHER PUBLICATIONS

WhirlWind, ExecutiveMarket Analysis Program, Gatner Group Executive Services, pp. 46–49, May 1993.
GartnerGroup Executive Services, "Executive Market Analysis Program," pp. 45–48, presented May 5, 1993.
GartnerGroup Executive Services, "Executive Market Analysis Program, Today's Marketplace Demands Better Analysis," pp. 11–36 (first provided to clients in Nov. 1993).

*Primary Examiner*—Thomas G. Black
*Assistant Examiner*—Frantz Coby
*Attorney, Agent, or Firm*—Wilson Sonsini Goodrich & Rosati

[57] ABSTRACT

A decision tool and method are provided for analyzing a decision among at least two alternatives based upon a plurality of criteria. The decision tool and method allow decision table data collected from a plurality of decision makers to be accurately aggregated, compared, and disaggregated. The decision tool and method also allow for generation of a prioritized list of areas where action can have maximum impact in the mind of decision makers. This may provide a guide for optimal allocation of resources to influence the outcome of a decision. An evaluation tool and method may be used to evaluate and improve customer satisfaction based upon a similar prioritized list.

20 Claims, 9 Drawing Sheets

SYSTEM AND METHOD FOR ANALYZING PROCUREMENT DECISIONS AND CUSTOMER SATISFACTION

RELATED APPLICATION

This application is a continuation-in-part patent application of application Ser. No. 08/305,105 filed Sep. 12, 1994, now pending.

BACKGROUNS OF THE INVENTION

1. Field of the Invention

The field of the present invention relates generally to database tools and methods, and more particularly to an apparatus and method for extracting and distilling useful information from a relational database containing decision table data.

2. Description of the Related Art

To improve its productivity, a business typically must either cut its direct costs, cut its indirect costs or increase the revenue-generating power of its employees. The extent to which cost cutting can be performed is constrained, so effort has been focused by the most sophisticated businesses upon increasing revenue-generating power. This, in turn, depends upon properly allocating resources according to customer perceptions of what is important and of how a company performs in those areas that are perceived as important. Resources may be allocated to, among other things, improving product performance, changing a company's image in the marketplace, or changing customers' perceptions of what is important.

In the past, tremendous effort has been expended on trying to discover customers' values and perceptions and on attempting to construct computer-based decision tables or models for customer behavior. The first step in these processes is typically the collection of decision table data through customer surveys. Decision table data typically includes a buyer's evaluation of the importance of various criteria in making a decision, and a rating for each criteria of one or more products, services, or vendors that were considered in making the decision.

The survey collects a list of decision criteria actually used by a buyer in a recent procurement as well as the relative importance of each criterion in the buyer's decision. In addition, for each of the buyer's decision criteria, the buyer's rating of the competing vendors, products and services is evaluated for that procurement.

For each purchase decision, respondents evaluate the relative importance of several different categories of buying criteria. Table 1 shows a sample form that might be used to collect decision table data for the purchase of a computer system.

TABLE 1

| Percent Importance of Category | Important At All | Category/Criteria | Weight | Ratings of Vendors A | B |
|---|---|---|---|---|---|
| | | Vendor Qualifications | | | |
| | | Financial strength | | | |
| | | Industry expertise/commitment | | | |
| | | Installed vendor | | | |
| | | Number of available applications | | | |
| | | Performance of total solution | | | |
| | | Product availability/prompt delivery | | | |
| | | Quality/reliability | | | |
| | | Range of product line/selection | | | |
| | | Sales interface/sales support | | | |
| | | Technological leadership | | | |
| | | Track record/reference | | | |
| 20% | | Hardware | | | |
| | ✓ | Compatibility with existing environment | 10 | 5 | 5 |
| | | Compatibility with IBMs ESCON | | | |
| | | Compatibility with IBMs sysplex | | | |
| | | Concurrent maintenance | | | |
| | | Environmental requirements | | | |
| | | Footprint | | | |
| | ✓ | Performance | 8 | 5 | 4 |
| | ✓ | Reliability/uptime | 10 | 5 | 5 |
| | ✓ | Serviceability | 8 | 5 | 5 |
| | ✓ | Upgradeability of processor | 7 | 5 | 4 |
| | | Vector facility | | | |
| | | Service & Support | | | |
| | | Ability to solve problems | | | |
| | | Development/integration tools | | | |
| | | Field engineer support | | | |
| | | Geographic distribution of service resources | | | |
| | | Industry/application expertise | | | |
| | | Responsiveness | | | |
| | | Skill level/resource availability | | | |
| | | Training quality/availability | | | |
| 80% | | Price | | | |
| | | Application price | | | |

TABLE 1-continued

| Percent Importance of Category | Important At All | Category/Criteria | Weight | Ratings of Vendors A | B |
|---|---|---|---|---|---|
| | | Channel price | | | |
| | ✓ | Hardware price | 10 | 5 | 2 |
| | ✓ | HW & system SW maintenance price | 8 | 4 | 3 |
| | | Professional services price | | | |
| | ✓ | System software price | 8 | 4 | 3 |
| | | Training & support price | | | |
| | | System Software | | | |
| | | Adherence to standards | | | |
| | | Compatibility with existing environment | | | |
| | | Compatibility with IBMs SW environment | | | |
| | | Connectivity/networking | | | |
| | | Functionality | | | |
| | | Performance | | | |
| | | Reliability/uptime | | | |
| | | Serviceability | | | |
| | | Usability/user friendliness | | | |

The categories of buying criteria in Table 1 are Vendor Qualifications, Hardware, Service & Support, Price, and System Software. Each buying criteria category is assigned a percent significance (from 0% to 100%) by the respondent and the percent significances are normalized so that their sum is 100%. This value is shown in the first column of Table 1, titled "Percent Importance of Category". A rating of "not significant" is assumed equal to 0%. In Table 1, Hardware has been assigned an importance of 20%, and Price has been assigned an importance of 80%.

For each buying criteria category with a percent significance larger than 0%, one or more decision criteria are identified. For each identified decision criterion that the respondent considers important (denoted by an √ in the second column of Table 1), the respondent provides an importance weighting value (from 1 to 10), as shown in column 4 of Table 1, denoting the importance of that criterion to selecting a vendor (with a 1 denoting the least important and a 10 denoting the most important decision criteria). In the sample shown in Table 1, the category of price has been broken down into seven criteria: Application price, Channel price, Hardware price, HW & system SW maintenance price, Professional services price, System software price, and Training & support price. Hardware price, HW & system SW maintenance price, and System software price have been marked as important and have been given importance weighting values of ten, eight, and eight respectively.

For each vendor that was considered a viable candidate in the purchasing decision and each identified decision criterion, the respondent provides a vendor rating score (from 1 to 5, where 1 denotes unacceptable and 5 denotes exceptional). These scores are not available for decision criteria that are part of categories that have been assigned a relative percentage importance of 0% (e.g., in these circumstances the vendor rating score is assigned a value of "missing"). For instance, in Table 1, Vendor A has been given a rating score of 5 for Hardware Price, and Vendor B has been given a 2.

While it is extremely difficult for a customer to explain why a procurement decision was made, it is believed that a customer's decision criteria, the importance of each criterion, and the ratings of vendors for each criterion can be determined with reasonable accuracy by using the above described survey techniques.

However, a large number of samples must be taken, and this information is, in the abstract, of limited usefulness. To make this information accessible and to allow for more advanced analysis, the data may be entered into a computerized relational database. A database is an organized collection of information or data. For instance, an employee address database may organize data into records containing fields for names, phone numbers, and addresses of a company's employees. Such a database may be thought of as a table in a computer's memory having a row for each record with columns for names, phone numbers, and addresses. A relational database allows a user to define a relationship between sets of data which may be maintained by the computer. For instance, in addition to an employee database, a company may maintain information about each division in the company. In a relational database, a computerized cross-reference or link may be maintained between the employee table and the division table which tells which employees belong in each division. In addition, relationships may be defined between tables on the fly. Once data has been entered into a computerized database, searches, computations, filtering and other operations may be performed on the data.

In the past, attempts have been made to understand customers' values and perceptions by entering decision table data from a survey into a computerized database. For instance, a past version of an Executive Market Analysis Program (EMAP) relational database developed by the Gartner Group, assignee of record of the present invention, has been used to compile survey data into an imputed decision table for a procurement in an attempt to document how a product, service or vendor was selected.

From the raw survey data, the earlier EMAP database derives a composite importance score for each decision criterion by multiplying the percent importance of the buying criteria category containing that decision criterion by the weight for that criterion. For example, in FIG. 1, the buying criteria category of Price is assigned a relative importance of 80% and the decision criterion of Hardware Price is assigned a weight of 10, so the composite importance score for Hardware Price is 80%×10=8. If a category is assigned a percent significance of 0, the composite importance scores of all decision criteria within that category are assigned a value of 0. Attempts have been made in the past to aggregate and evaluate decision table data for multiple procurements and vendors. This has been attempted by calculating two statistics: the average composite importance score for different decision criteria, and the average vendor rating score for different decision criteria. The average composite importance score for a decision criteria is obtained in the earlier EMAP database by summing the composite importance scores for the decision criteria over the purchasing decisions and dividing that sum by the number of decisions made. The average vendor rating score for a decision criteria is obtained by first identifying a particular vendor and decision criterion, summing the vendor rating scores for that vendor over all purchasing decisions for which these scores are available and dividing by the number of such purchasing decisions for which these scores are available.

These scores may displayed in bar chart form to convey the results to a user. The earlier EMAP database uses Whirlwind® profiles to display the results. Referring to FIG. 1, for each criterion that has an average composite importance greater than zero, a horizontal bar 1–24 scaled according to the average composite importance score for the decision criteria is displayed. For each category 30–33, the criteria may be arranged so that the most important criterion (with the largest bar) appears on top. For instance, FIG. 1 may represent average survey data collected using the form shown in Table 1, with category 30 being Price, category 31 being Service & Support, category 32 being Hardware, and category 33 being Vendor Qualifications. Within the Price category 30, importance bar 1 may correspond to Hardware Price, bar 2 to HW & System SW maintenance price, bar 3 to System software price, bar 4 to Training & support price, bar 5 to Professional services price, and bar 6 to Application price. The seventh criteria in the Price Category, Channel price, is not represented in FIG. 1. This means that, for the sample data used to generate FIG. 1, no respondent ranked Channel price as being important to the decision of which computer system to purchase. The other categories shown in FIG. 1 would have similar correspondences to the criteria listed in Table 1. This Whirlwind® profile is meant to visually convey what categories and criteria are most important to buyers. Alternatively, the bars could be sorted from most important to least important criterion across all categories.

These bars also act as a backdrop for displaying a vendor's performance as indicated by the vendor's rating scores. A vendor's average rating scores may be displayed along the composite importance bar scaled such that scores of "unacceptable" appear at the left edge of the bar and scores of "exceptional" appear at the right end of the bar. Since the rating scores are scaled according to the average composite importance bar for the criterion, each point in a rating score accounts for a greater distance along the importance bar for more important criteria.

Multiple vendors, services, or products may be displayed on the Whirlwind® profile to provide a scorecard for comparison. In FIG. 1, a first vendor's scores are shown with circles 40, and a second vendor's scores are shown with squares 50. Each vendor's scores are connected by a line (60 and 70) to help visually convey the vendor's performance to the user. Since the display is scaled against the average composite importance for each criterion, the same difference in ratings for the vendors will appear larger for more important criterion.

As is known in the statistical arts, it may be determined whether the difference in two rating scores for a given criterion are statistically significant for a given confidence level. The earlier EMAP database further helps convey survey results to a user by displaying a vendor's score using a solid mark (40 or 50) where the difference between rating scores is statistically significant. A hollow mark (80 and 90) is used where the difference in vendor rating scores is not statistically significant. The user may select from several confidence levels in the earlier EMAP database.

It is believed that the earlier EMAP database provides a useful tool for understanding buyers' procurement decisions. However, there are several disadvantages to using such a system. First, aggregating and/or comparing survey results from different buyers, while often providing insight into buyers' values, also may produce inaccurate and misleading results in some cases. Each buyer surveyed may have a different way of weighting decision criteria. Some buyers give lower scores across the board, while others tend to give higher scores. Thus, one buyer's idea of what is a high score for importance may be, and often is, different from other buyers' ideas of what is a high score. Thus, buyers' scores may not be accurately aggregated, disaggregated or compared directly.

In addition, it is a disadvantage of the prior art EMAP database that information is only provided in terms of a buyer's procurement decision. While it is useful to gain insight into a buyer's criteria and ratings for a procurement, this alone does not tell a vendor how to allocate resources to have a maximum impact on buyers' procurement decisions. For instance, a criterion may be very important to a buyer, but there may be little room for the vendor to improve. Alternatively, there may be room for improvement, but it may be that all vendors are ranked similarly for that criterion. Prior art computerized databases have not been able to transform a buyer's decision table for a procurement into a vendor's guide for improving its performance.

Yet another disadvantage of the past EMAP database is that it only presents information based upon actual comparisons made by a buyer. Since decision table data cannot be accurately combined or filtered, there is no accurate way to perform predictive analysis for products that have not competed head to head in the marketplace.

What is needed therefore is an apparatus and method for more accurately aggregating decision table data for a decision among alternatives, and for providing a prioritized list of criteria that have the greatest impact on the decision. What is also needed is an apparatus and method for combining and filtering decision table data for predictive analysis. Preferably such an apparatus and method will allow alternatives (such as different products) to be compared even when they were not directly compared by individual buyers or decision makers.

SUMMARY OF THE INVENTION

In order to overcome the above-discussed disadvantages of known decision table database methods, one aspect of the present invention provides for the normalization of importance measurements for the criteria evaluated.

It is an advantage of this and other aspects of the present invention that decision table data in the database may be aggregated, filtered and/or disaggregated. It is a further advantage of this and other aspects of the present invention that ratings of different alternatives may be compared across aggregated decision table data even though no individual set of decision table data compares the alternatives directly.

Another aspect of the present invention provides an apparatus and method for combining importance and rating measurements for criteria to predict the likely impact of an individual criterion on a decision.

Yet another aspect of the present invention provides an apparatus and method for combining importance and rating measurements for criteria to predict the leverage associated with an individual decision criterion.

It is an advantage of these and other aspects of the present invention that the criteria may be prioritized based upon potential impact or leverage. This in turn may be used to identify those criteria where the best opportunity exists for influencing a decision. This prioritization may be used to access comments or justifications for ratings provided by decision makers or customers in an efficient manner. A large volume of data may thus be filtered so that only areas having the greatest competitive impact are examined.

BRIEF DESCRIPTION OF THE DRAWINGS

These and other features and advantages of the present invention will become more apparent to those skilled in the art from the following detailed description in conjunction with the appended drawings in which.

GLOSSARY OF TERMS

A "Criterion" is a tag or data representative of a standard or factor upon which a decision may be based which is used in a computer memory to structure and associate data related to the decision which may include a measure of the importance of the criterion and rating scores for an alternative for the decision.

An "Alternative" is a tag or data representative of a product, service, vendor or other choice for which a decision is made and which may be used to structure and associate rating scores for criteria in a computer memory.

"Importance" is data representative of a subjective measure of the significance of a criterion in making a decision associated with or linked to that criterion in a computer memory. Since importance is representative of a subjective measure, an aspect of the present invention provides for the normalization of importance before different importance values are aggregated, compared or disaggregated.

A "Rating Score" is data representative of a subjective measure of the performance or ranking of an alternative for a given criterion which is linked or associated with both the criterion and the alternative in a computer memory.

A "Justification" is data explaining a decision maker's reasons for a particular rating score for a given criterion and alternative which is linked or associated with both the criterion and the alternative in a computer memory.

"Competitive Edge" is data representative of the relative advantage in rating scores one alternative has over another associated with or linked to a specific criterion in a computer memory.

"Opportunity to Improve" is data representative of the difference between a perfect rating score and an alternative's rating score associated with or linked to a specific criterion in a computer memory.

"Leverage" is data representative of a combined measure of importance, competitive edge, and opportunity to improve associated with or linked to a specific criterion in a computer memory which may be used to rank or sort the criterion relative to other criteria. Leverage is indicative of the relative likelihood of impacting the outcome of a decision by attempting to alter the rating scores for a particular criterion.

Figure 4:
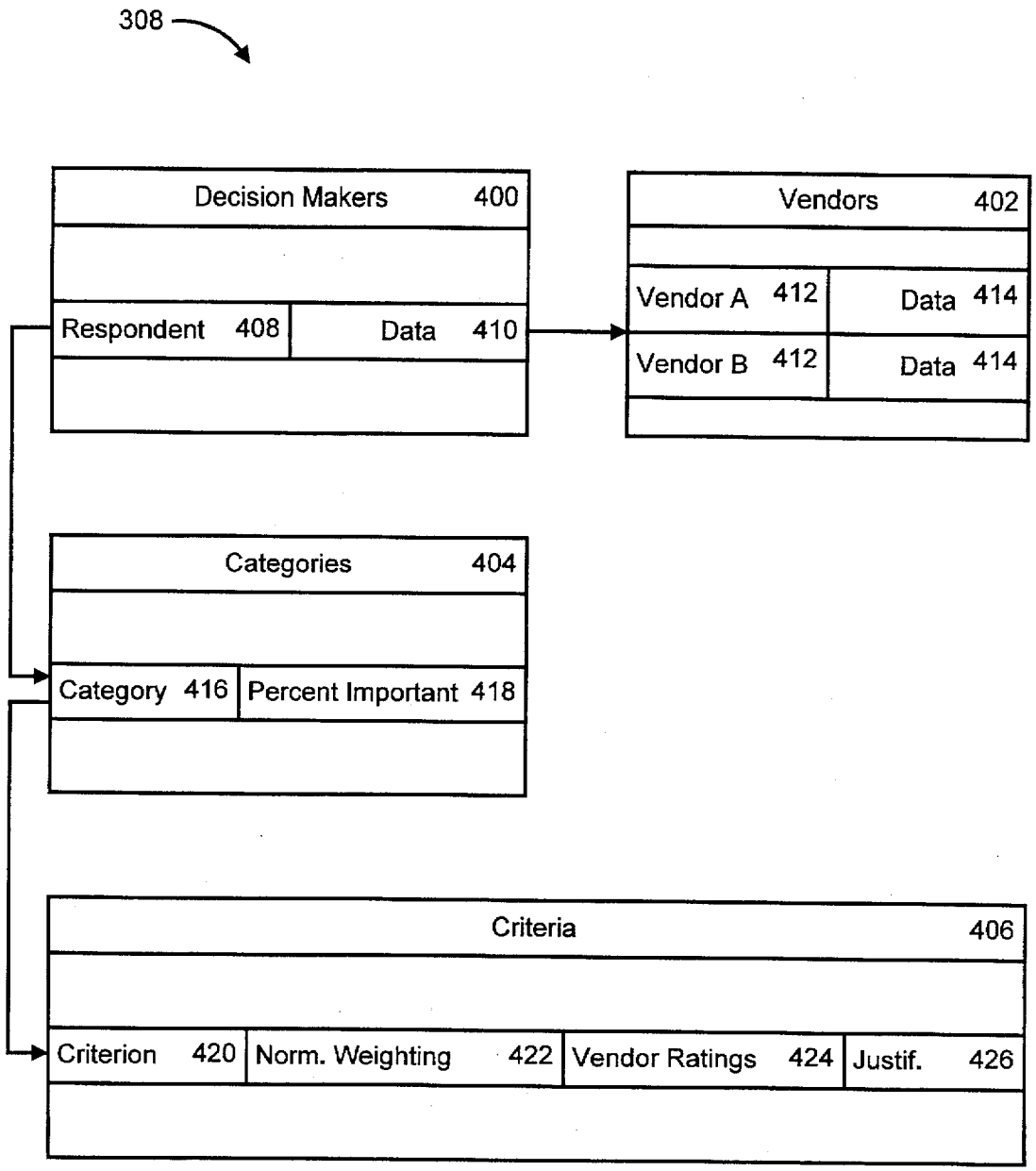
FIG. 4 is a diagram showing a data structure for storing decision table data according to the first embodiment of the present invention.

FIGS. 4 and 9 illustrate examples of the relationships of the above data structure elements in presently preferred embodiments of the present invention.

DESCRIPTION

One aspect of the present invention comprises a novel apparatus and method for a decision table database tool on a programmed computer. The following description is presented to enable any person skilled in the art to make and use the invention. Descriptions of specific applications are provided only as examples. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 1:
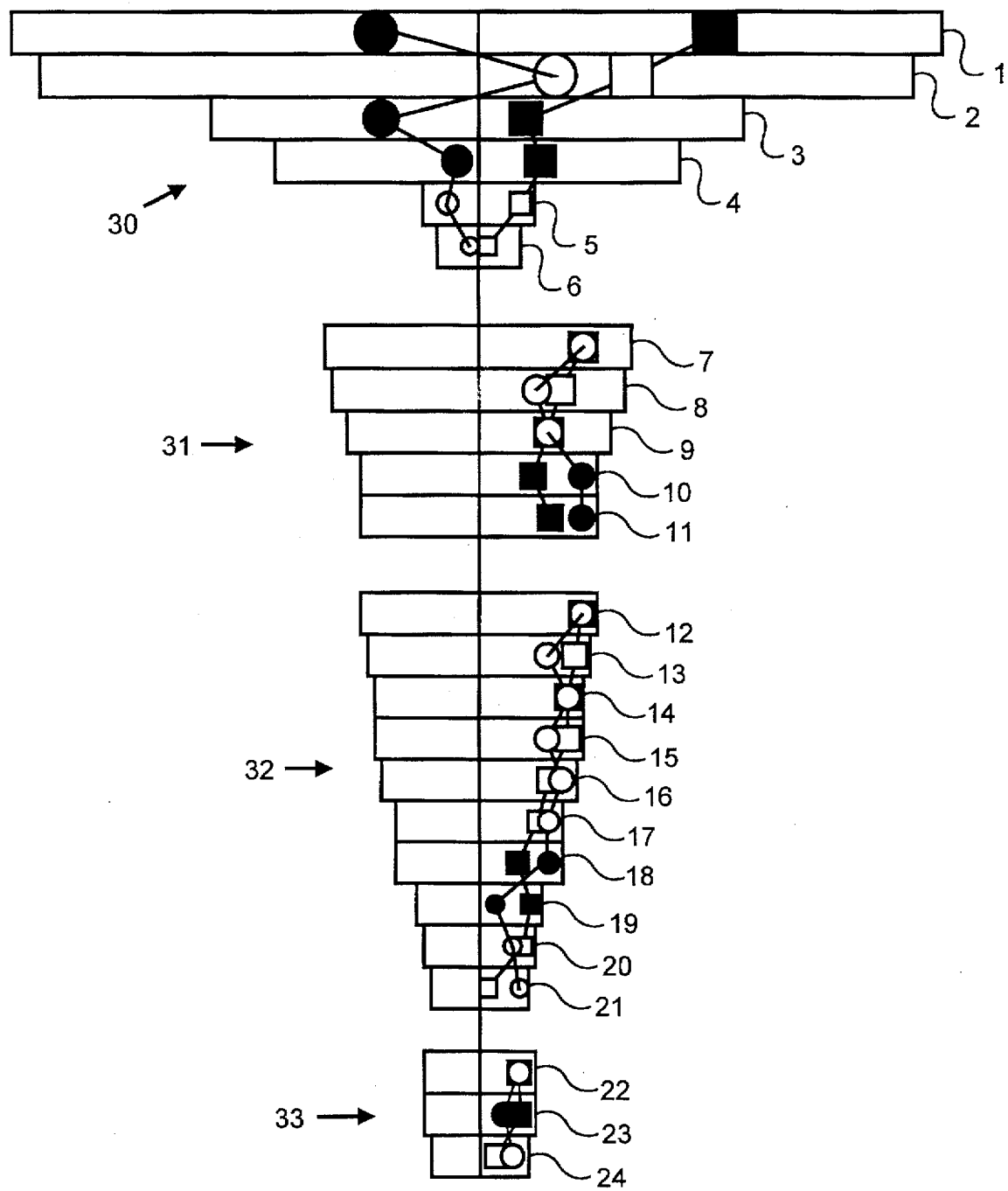
FIG. 1 is an earlier graphical profile for displaying decision table data.
Figure 2:
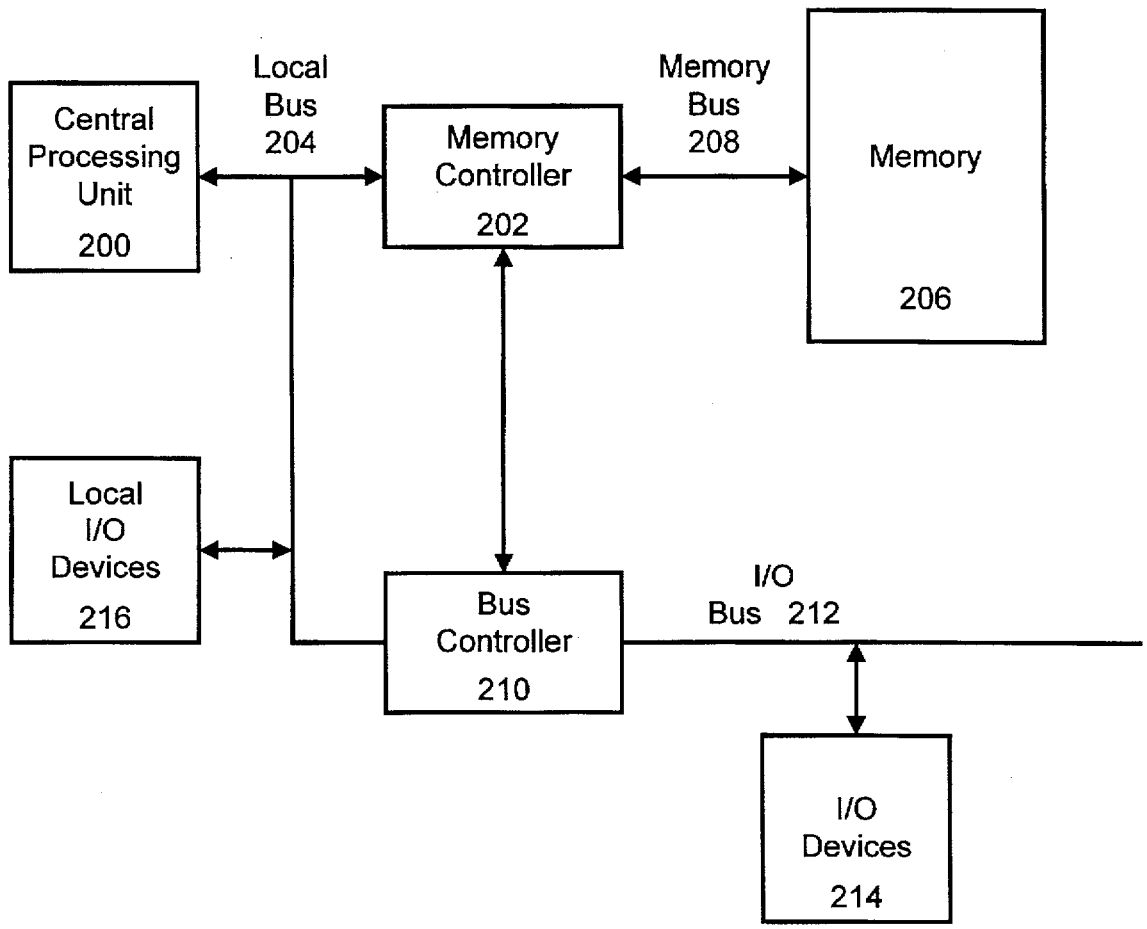
FIG. 2 is a schematic of a computer system which may be used in conjunction with a first embodiment of the present invention.

A first embodiment of the present invention provides a decision table database tool that is executable on a general purpose programmable computer system. Examples of such computer systems include IBM compatible personal computer systems running the DOS operating system and the Apple Macintosh computer system running the Apple System 7 operating system. FIG. 2 shows one of several common architectures for such a system. Referring to FIG. 2, such computer systems may include a central processing unit (CPU) 200 for executing instructions and performing calculations, a memory controller 202 coupled to the CPU 200 by a local bus 204, a memory 206 for storing data and instructions coupled to the memory controller 202 by memory bus 208, a bus controller 210 coupled to the memory controller 202, an input/output (I/O) bus 212 coupled to the bus controller 210, and I/O devices 214 coupled to the I/O bus 212. As is known in the art, the various buses provide for communication among system components. The I/O devices 214 preferably include a manually operated keyboard and a mouse or other selecting device for input, a CRT or other computer display monitor for output and a disk drive or other storage device for non-volatile storage of data and program instructions. As is known in the art, some or all of the input/output devices may be Local I/O devices 216 which may be attached to the local bus 204 instead of the I/O bus 212. The operating system typically controls these components and provides a user interface. The user interface is preferably a graphical user interface which includes windows and menus that may be controlled by the keyboard or selecting device. Of course, as will be readily apparent to one of ordinary skill in the art, other computer systems and architectures are readily adapted for use with embodiments of the present invention.

Preferably, the first embodiment is implemented using a relational database that is easily ported to different computer systems. Examples of such a database are "Oracle Database for DOS or for Macintosh Version 6.0A" from Oracle Corporation, and "Paradox" from Borland International, Inc. Of course, as will be readily apparent to one of ordinary skill in the art, other database systems, such as flat file systems, or other methods for storing and managing decision table data may be used to implement aspects of the present invention.

The decision table data to be used with the first embodiment may be collected using the survey methods discussed above in the Background section with reference to Table 1. For each decision, the decision table data typically includes a measurement of perceived importance of various decision criteria, and a rating of alternatives for each decision criterion. In the example shown in Table 1, the decision is the purchase of a computer system, and the decision maker is a buyer who has recently purchased a computer system. The alternatives are computer systems from different vendors (A and B) that are considered in making the decision. In addition, the buyer's justifications for ratings in a particular category may also be elicited. The buyer's justifications are important because they explain what a specific buyer's ratings really mean. For instance, a poor rating in a category such as "Hardware Performance" could be due to, for instance, poor CPU performance or poor graphics accelerator performance. The textual explanation of the poor rating illuminates the underlying problem and is helpful in determining the ultimate solution. While reference will be made to buyers and vendors throughout for illustrative purposes, it will be readily appreciated by one of ordinary skill in the art that aspects of the present invention may be applied to decision table data for any variety of decisions and alternatives. For instance, aspects of the present invention may be used to evaluate customer satisfaction with a service provider, or to evaluate and prioritize criteria in a focus group addressing a particular problem.

Figure 3:
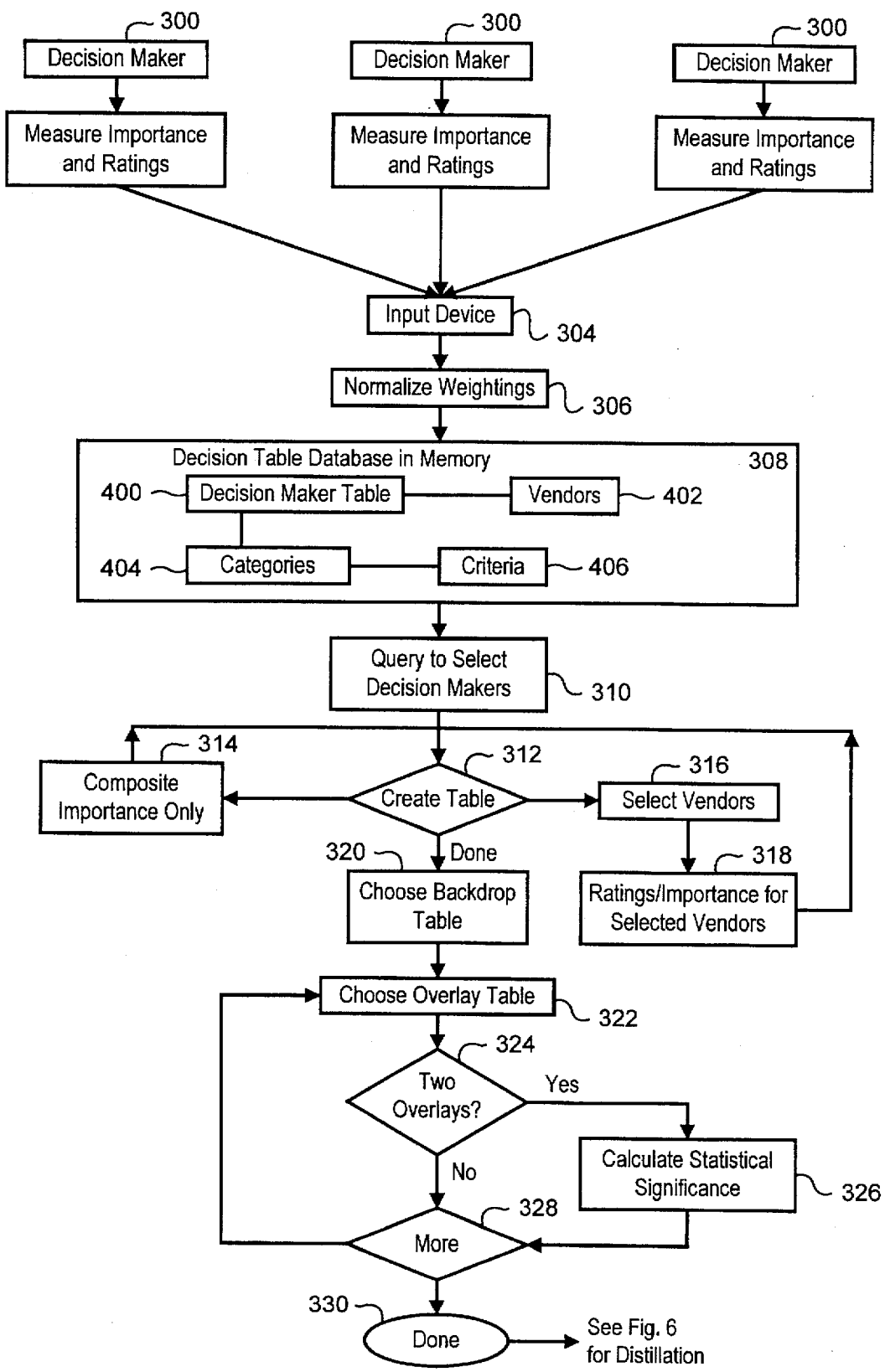
FIG. 3 is a flowchart illustrating the operation of a programmed computer according to the first embodiment of the present invention.

FIG. 3 is a flowchart illustrating the operation of a programmed computer according to the first embodiment of the present invention. As shown in FIG. 3, decision table data is first collected from decision makers 300. This may be achieved by using a survey as discussed above with reference to Table 1. A person who has recently been faced with a decision among alternatives is asked to evaluate the relative importance of several different categories of decision criteria by assigning a percentage of importance to each category. The person is then asked to mark those criteria in each category that are important, and to assign an importance weighting value to each criterion. The importance weighting value is preferably a numerical rating based upon a scale of 1 to 10. The person then identifies each of the alternatives for a given decision and assigns a rating score for each. The rating score is preferable a numerical rating based upon a scale of 1 to 5, where 1 denotes unacceptable and 5 denotes exceptional. In addition, the person is asked to provide justifications for the importance and/or ratings assigned in each category.

In a typical example, the person responding to the survey, referred to generally as a decision maker, is a buyer who has just purchased a product, such as a computer system. The categories and criteria may be those shown in Table 1. The alternatives may be the different computer systems that the person has considered buying. As discussed previously, the accuracy of such a survey depends upon collecting information for all of the categories and criteria that were important to the person making the relevant decision. It should also be noted that such a survey does not measure an objective truth, but rather measures a buyer's perceptions of what is important in making a decision. However, it is these perceptions that are important in understanding a decision. For the purchase of a computer system, for instance, the survey is directed at buyers' perceptions of what criteria are important and of how different computer systems rate for those criteria.

Of course, the present invention is not limited to use with information related to procurement decisions, but may be applied to any well-defined decision among alternatives. For instance, aspects of the present invention may be applied to customers evaluating or deciding among service providers. In addition, while the decision data is preferably collected by survey, no claim is made to particular survey or data collection techniques, and it is understood that the present invention is not limited to any particular method of collecting or measuring such decision data. For instance, it is not necessary to break criteria down into categories, although it has been found to be helpful when dealing with a large number of criteria. For a survey without categories, the techniques of the first embodiment of the present invention may be applied by assuming that there is one category with an importance of 100%. Another survey technique involves having the respondent list the criteria that were important in each category without reviewing a long list of predetermined criteria. The criteria identified by the respondent are then correlated to the predetermined criteria by the person giving the survey.

Once the decision data has been collected, it is entered into the computer system through an input device 304, such as a keyboard or the like, as shown in FIG. 3. Rather than entering the decision data into the relational database directly, it may first be input into a program such as 4D from ACI Incorporated or Excel from Microsoft Corporation. Then the data may be output in tab delimited form and run through an installer program to create the desired tables for the relational database. Of course, a wide variety of input mechanisms may be used for different embodiments of the present invention, and the particular mechanism depends upon the form of the collected decision data and the type of computer database used. From the decision data a decision table can be imputed and displayed for each decision maker. However, as discussed previously, generating decision tables for individual decision makers is of limited value. Each decision maker has a different way of allocating importance weighting values. Two decision makers may feel the same about a particular decision criterion, yet one may give it an importance weighting value of 2 while the other may give it a value of 3. Thus, the data for individual decision makers cannot be accurately aggregated, disaggregated, or compared without some modification.

In order to overcome this problem, the first embodiment of the present invention provides a normalized weighting value for each decision criterion, as shown at box 306 in FIG. 3. This normalized weighting value can then be used to calculate normalized importance values as necessary. In the first embodiment, this normalization is performed by an installer program prior to loading the decision data into the decision table database. For each decision maker, the installer program processes each category and criterion from the survey that has been assigned an importance. For each criterion, the program generates and stores a normalized weighting value. In the first embodiment, this is accomplished by executing program instructions from memory 206 on the CPU 200. The calculation of normalized weighting values is illustrated in Table 2.

TABLE 2

```
For each category (i) do {
    For each criterion (j) do {
        Norm_Weighting_{ij} = Weight_{ij}/ΣWeight_{i}
    } /* end For */
} /* end For */
```

This field is generated by taking the importance weight for each decision criterion, $Weight_{ij}$, and dividing by the sum of all importance weights in a given category of decision criteria, $\Sigma Weight_i$. For instance, in Table 1, the normalized weighting value for the criteria Performance in the category Hardware would be 8/(10+8+10+8+7)=0.186. This normalization assures that the sum of all normalized weighting values in each category add up to 1 (this may be approximate depending on rounding). It is not necessary that these normalized weighting values be scaled to 1, provided that they are normalized in the same manner for each decision maker. Using normalized weighting values allows importance measurements to be generated consistently for different decision makers. Of course, it will be readily understood that the importance measurements could be normalized directly at a later point in the process. What is desired for the first embodiment is that the decision data for different decision makers be normalized at some point so that it may be aggregated, compared, or disaggregated accurately as discussed further below.

For the first embodiment, the decision data is loaded into a relational database in memory after normalized weighting values are calculated. For the first embodiment, this data is stored in a data structure in memory 308, as illustrated in FIGS. 3 and 4. The data structure associates a set of decision data into tables for each of the decision makers from whom data was collected. Referring to FIG. 4, this data structure preferably comprises four logical tables in memory: a table of Decision Makers 400, Vendors 402, Categories 404, and Criteria 406. The Decision Makers table 400 has a row for each respondent 408 to the survey (each decision maker) and has fields for storing non-recurring data 410 related to each respondent 408. The data 410 may include, among other things, the respondent's name, title, the date of the decision, and the outcome of the decision among other things. This data 410 may be useful for performing queries on the decision table database, but is not required in the first embodiment of the present invention. For each respondent 408, there may be a separate Vendors table 402, Categories table 404, and one or more Criteria Tables 406. A table of Vendors 402 may provide data specific to vendors 412 considered by a respondent 408 in making a decision. Once again, the data 414 may be useful for performing queries on the decision table database, but is not required in the first embodiment of the present invention.

The Categories table 404 contains a row for each category 416 rated as important by the respondent 408, as well as the percent importance 418 assigned to that category by the respondent. As will be apparent to those of ordinary skill in the art, categories simplify the survey process, but are not strictly required. A survey without categories can be thought of as a survey with one category having 100% importance. In such a case, the Categories table 404 would not be necessary and the Decision Makers table 400 could be linked directly to the Criteria table 406. Even if categories are used in the survey, importance could be calculated for each criterion up from and stored in a Criteria table 406 directly. This would eliminate the need for maintaining the Categories table 404. However, a Categories table 404 is preferred in the first embodiment so that the decision table database may be queried based on information related to categories.

For each category 416 in the first embodiment, a Criteria table 406 is provided which contains each criterion 420 in the category 416 that the respondent 408 marked as important in making the decision. The normalized weighting value 422 and the ratings for each vendor 424 are stored for each criterion 420. In addition, a justification for each vendor's rating 426 may be stored in the criteria table 406 associated with each criterion and/or vendor.

Once the decision data is loaded into the Decision Table Database 308, a query may be performed to select all or a subset of the data for further processing (see box 310 in FIG. 3). A query may be performed on any field or combination of fields in the Decision Table Database 308. Standard Query Language (SQL) may be used for this purpose in the first embodiment. Of course, Query by Example (QBE) or other methods of selecting data may be used as will be readily apparent to those of ordinary skill in the art. In the first embodiment, the user preferably interacts with a user interface using an I/O device 214 or Local I/O device 216 to perform the desired query or selection. Alternatively, all of the data may be used where querying is not provided. However, querying or other data selection allows different aggregations of decision table data to be processed.

In the first embodiment, the user may then generate new tables from the selected set of data. As shown at box 312 in FIG. 3, the user may select and create a new table to be used for further processing. In the first embodiment, the user interface provides the user with options as to what new tables should be generated. The user selects the desired option with a mouse or other selecting device.

One option 314 is to generate the composite normalized importance for each criterion in the selected set of data. For this option, the program processes each category and criterion in the selected set of data that has been assigned an importance. For each criterion rated by a given respondent, the program first generates and stores a normalized importance value. Then the program averages the normalized importance values for all respondents to produce an average normalized importance value for each criterion. In the first embodiment, this is accomplished by executing program instructions from memory 206 on the CPU 200. The calculation of normalized importance values is illustrated in Table 3.

TABLE 3

```
For each category (i) do {
    For each criterion (j) do {
        Norm_Import_{ij} =
            Import_Cat_i * Norm_Weighting_{ij}
    } /* end For */
} /* end For */
```

This value is generated by taking the normalized importance weighting value for each decision criterion, $Norm\_Weighting_{ij}$, and multiplying by the relative importance of the given category, $Import\_Cat_i$, to provide the normalized importance value for the decision criterion, Norm_Import$_{ij}$. For instance, in Table 1, the normalized weighting value for the criterion Performance in the category Hardware would be 8/(10+8+10+8+7) =0.186. The normalized importance would be 20%*1.86=3.7%. Using normalized weighting values assures that the sum of all normalized importance values for each decision maker adds up to 100% (this may be approximate depending on rounding). It is not necessary that these normalized importance values be scaled to 100%, provided that they are normalized in the same manner for each decision maker. Since these values are scaled to the same value for each decision maker, the normalized importance values for different decision makers may be aggregated and compared.

Thus, the normalized importance from each respondent who ranked a criterion may be added to a running total to calculate an aggregate normalized importance for the criterion. At the end of this process, the total is divided by the number of respondents in the selected set of data to provide an average normalized importance for the criterion. Respondents who did not rank a criterion as important are counted for purposes of the division which effectively treats them as if they assigned an importance of 0 to the criterion. In the first embodiment, these steps are performed by executing program instructions from memory 206 on the CPU 200. Of course, it will be readily apparent to those of ordinary skill in the art that the average normalized importance may be generated in other equivalent manners. For instance, the calculation of normalized weighting values could be combined with the calculation of normalized importance in a single step. In addition, the program may loop through the data in a different order while still achieving the same result.

The steps used to generate the average normalized importance values for each criterion will, of course, depend upon the type and form of data originally collected from decision makers. As will be readily apparent to one of ordinary skill in the art, the process may be simplified if only one category is used. Alternatively, decision makers could be asked to assign a percentage importance directly to each criterion such that the total adds up to 100%. What is desired for the first embodiment of the present invention is that an average normalized measure of importance for each decision criterion be provided to, or generated by, the database program. It is believed, however, that the accuracy and simplicity of the data collection process is improved when decision criteria are broken into categories, which are assigned separate importance values.

Once generated, the average normalized importance values for each criterion are stored in a table in memory 206 or on an I/O storage device (such as a disk drive or the like) for later use. The data structure for storing these values may be a table having rows for each criterion, and a column containing the average normalized importance values. It will be readily understood that while the original data structure 308 maintained multiple tables for multiple respondents 408, only one table is needed for average normalized importance, since the data for the respondents 408 has been averaged. These average normalized importance values are indicative of the average importance assigned to each criterion for making a decision by the respondents represented in the selected set of decision data. The average normalized importance values are extremely valuable for determining what a group of customers or other decision makers perceive as important in making a decision.

Figure 5:
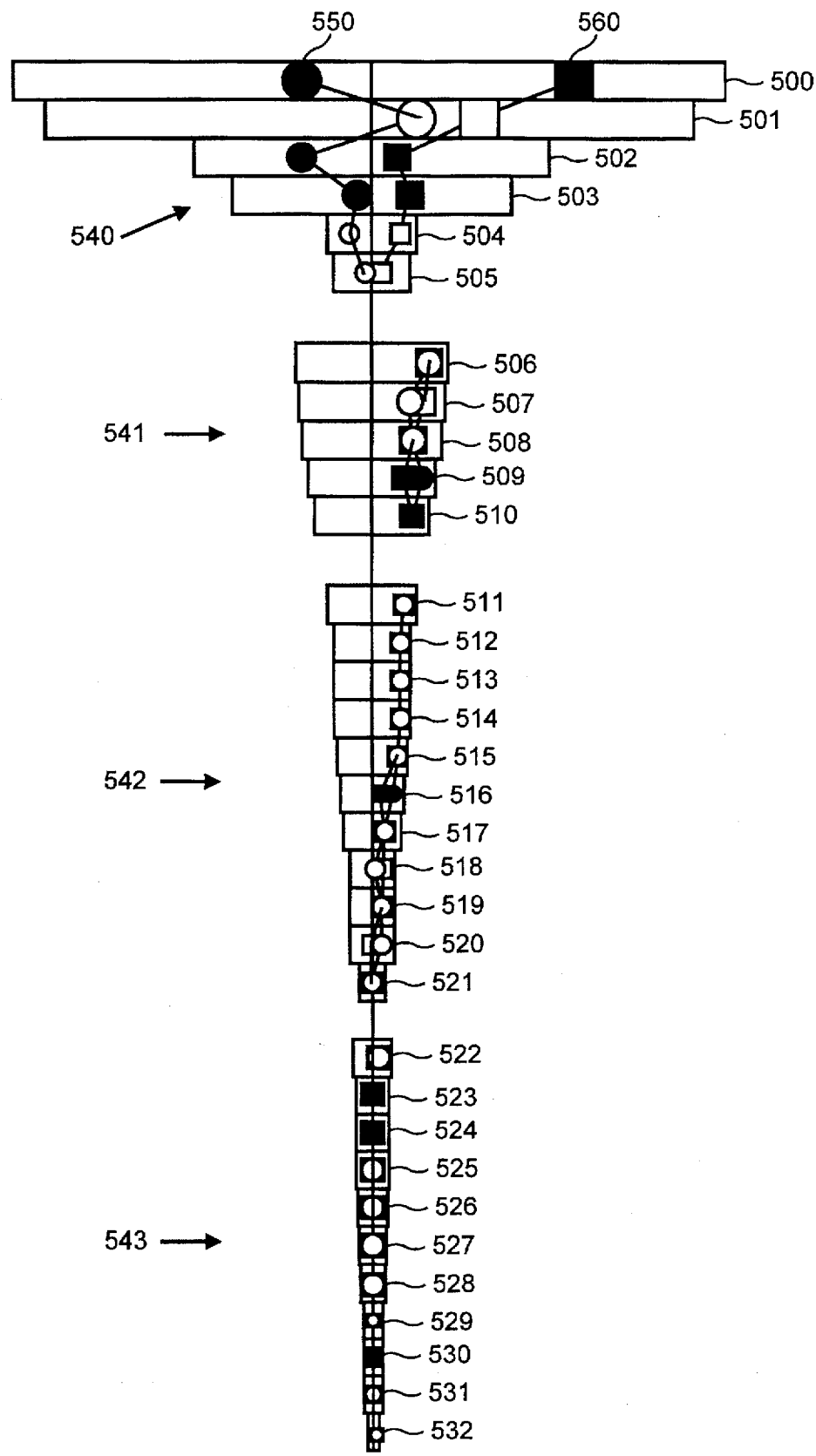
FIG. 5 is a graphical profile for displaying decision table data according to the first embodiment of the present invention.

It is believed that the average normalized importance value more accurately represents the average importance of a criterion for a group of decision makers than previous techniques. FIG. 5 illustrates a Whirlwind® profile according to the first embodiment of the present invention. The bars 532 provide a backdrop representative of the average normalized importance of each criterion. The group of decisions represented by the average normalized importance value may be expanded by averaging in normalized importance values from additional decision makers. Similarly, the group may be subdivided by removing values from the average. This may be accomplished by altering the values used to query the Decision Table Database, or by averaging the data together directly. This is the basis for decision table arithmetic, discussed below, which allows predictive analysis to be performed.

Referring to FIG. 3, at box 312 a user may also choose to generate a table for a selected vendor or vendors. In the first embodiment, the user may select a vendor or set of vendors at 316 by using a selecting device, such as a mouse or the like, to interact with the user interface. The programmed computer responds by selecting only the data for those respondents who considered the vendor in making a decision. In the first embodiment, the user may also select data only for respondents who considered and chose the product of the vendor (a win) or only for respondents who considered and did not choose the product of the vendor (a loss). For the selected vendor or vendors, the program then generates a table containing the ratings for the vendor (see box 318 in FIG. 3). The program loops through the respondents in the Decision Maker Table 400, as well as each decision criterion in the respondent's associated categories and criteria Tables 404 and 406. For each decision criterion 420, the rating scores for the vendor or vendors are summed over all of the decisions represented in the selected set of data for which these scores are available. Then that sum is divided by the number of such decisions in the selected set of data. This process is carried out in the first embodiment by executing program instructions from memory 206 on the CPU 200. The resulting value represents the vendor's average rating for a criterion across those respondents who considered the vendor in making a decision. The average rating scores may be stored in a table in memory 206 or on an I/O storage device for later use. The data structure for storing these scores may be a table having a row for each criterion and a column for the vendor's average rating score. The average rating scores are indicative of the performance of a vendor independent of importance. Importance, on the other hand, is indicative of how important a criterion is in making a decision independent of any particular vendor.

The programmed computer of the first embodiment also calculates average normalized importance values for the data selected for a specific vendor at 318. This allows the user to compare the overall importance for a criterion calculated at 314 to the importance for only those respondents who considered the particular vendor. In addition, the importance of criterion for wins only or losses only may be calculated. These alternative sets of average normalized importance values may be compared to each other to determine how values differ in different market sectors, or used as backdrops for Whirlwind® graphical profiles. These values may be stored as an additional column in the table used to store a vendor's average rating scores.

The above process of generating average normalized importance and average rating scores in tables may be continued until all of the desired values have been generated and stored in memory 206 or on an I/O storage device such as a disk drive or the like. After the average normalized importance values and average rating scores have been calculated for the selected data, the user may display the results on a Whirlwind® graphical profile. In the first embodiment, the user first selects a backdrop for the profile at 320 in FIG. 3 by interacting with the user interface with a selecting device, such as a mouse or the like. For the first embodiment, the backdrop is typically the overall normalized importance values calculated at 314 and stored in memory or on storage. Average normalized importance values for subsets of data (for a specific vendor or vendors) calculated at 318 may be used as alternative backdrops. This step 320 provides the bars, 500–532 of the Whirlwind® graphical profile as shown in FIG. 5 which may be output on a display or other I/O device. The widths of the bars 500–532 are scaled according to the average normalized importance values for the criteria in the selected set of data that were ranked as important. For instance, bar 500 may correspond to Hardware Price, bar 501 to HW & System SW maintenance price, and so on. The average normalized importance bars 500–532 may be grouped into categories, such as Price 540, Vendor Qualifications 541, Hardware 542, and Service & Support 543. Categories and criteria that were not ranked as important are not represented on the Whirlwind® graphical profile of the first embodiment. The Whirlwind® graphical profile is preferably output on a CRT, printer or other output device to communicate the results to the user.

Then at 322, the user selects an overlay for the Whirlwind® graphical profile. For the first embodiment, the overlay is typically the average rating scores for a selected vendor or vendors as calculated at 318 and stored in memory or on storage (referred to as a "score overlay"). Alternatively, another set of average normalized importance bars could be overlaid for comparison. For the first embodiment, the overlay is chosen by interacting with the user interface with a selecting device, such as a mouse or the like. For a score overlay, as shown in FIG. 5, the average rating scores may be displayed along the average normalized composite importance bar, scaled such that scores of "unacceptable" appear at the left edge of the bar and scores of "exceptional" appear at the right end of the bar. Since the rating scores are scaled according to the average normalized importance for purposes of display, each point in a rating score accounts for a greater distance along the average normalized importance bar for more important criterion.

Multiple vendors, services, products, or other alternatives for a decision may be displayed on the Whirlwind® profile by choosing additional score overlays at steps 328 and 322. This provides a scorecard for comparison. In FIG. 5, a first vendor's average rating scores are shown with circles 550, and a second vendor's average rating scores are shown with squares 560. It will be noted that, due to normalization, the scorecard will be different than previous scorecards discussed above in the Background section.

Referring to FIG. 3 at 324 and 326, when two score overlays are provided, the first embodiment preferably calculates the statistical significance of the difference between vendors' rating scores using statistical techniques known in the art. The difference between rating scores is referred to as competitive edge when two vendors are being compared. Preferably, the display of the Whirlwind® profile may be altered to show which criteria have a statistically significant competitive edge. As with previous scorecards, this may be accomplished in the first embodiment by displaying solid marks where there is statistical significance and hollow marks where there is no statistical significance.

The decision table data may be aggregated or filtered to produce Whirlwind® profiles and scorecards for different groups of decisions represented in the database. Due to normalization, the decision table data gains commutative properties, so decision table data may be added or subtracted to represent a desired segment of the surveyed market. For instance, a scorecard for all decisions where a vendor was considered may be divided into two scorecards, one showing wins and one showing losses. It should be noted that the wins scorecard and the losses scorecard can be added back together to form the original scorecard. In this way, the varying values and perceptions for different segments of a market may be analyzed. Different segments of the data may be selected for analysis at the query stage 310 or at the select vendors stage 316 of the first embodiment. Using these techniques, the performance of vendors or other decision alternatives (such as an evaluation of service providers) may be compared even where they did not compete head to head, at least for those criterion where both the vendors have received rating scores. This allows predictive analysis to be performed.

In addition to the improvements described above, the first embodiment of the present invention also allows decision table data to be converted into a prioritized list of criteria that impact a decision or set of decisions. This list is called a distillation. For instance, a distillation for a vendor of computer systems will provide a prioritized list of areas where positive actions should be taken to improve the vendor's ratings and performance in the marketplace. A distillation may be selected in the first embodiment by the user after two score overlays have been placed on a Whirlwind® backdrop. It should be realized, however, that distillations may be performed independently of displaying Whirlwind® graphical profiles. In the first embodiment, however, distillations are performed after two score overlays have been selected for a Whirlwind® graphical profiles, since distillations use some of the same information as a Whirlwind® graphical profile.

Figure 6:
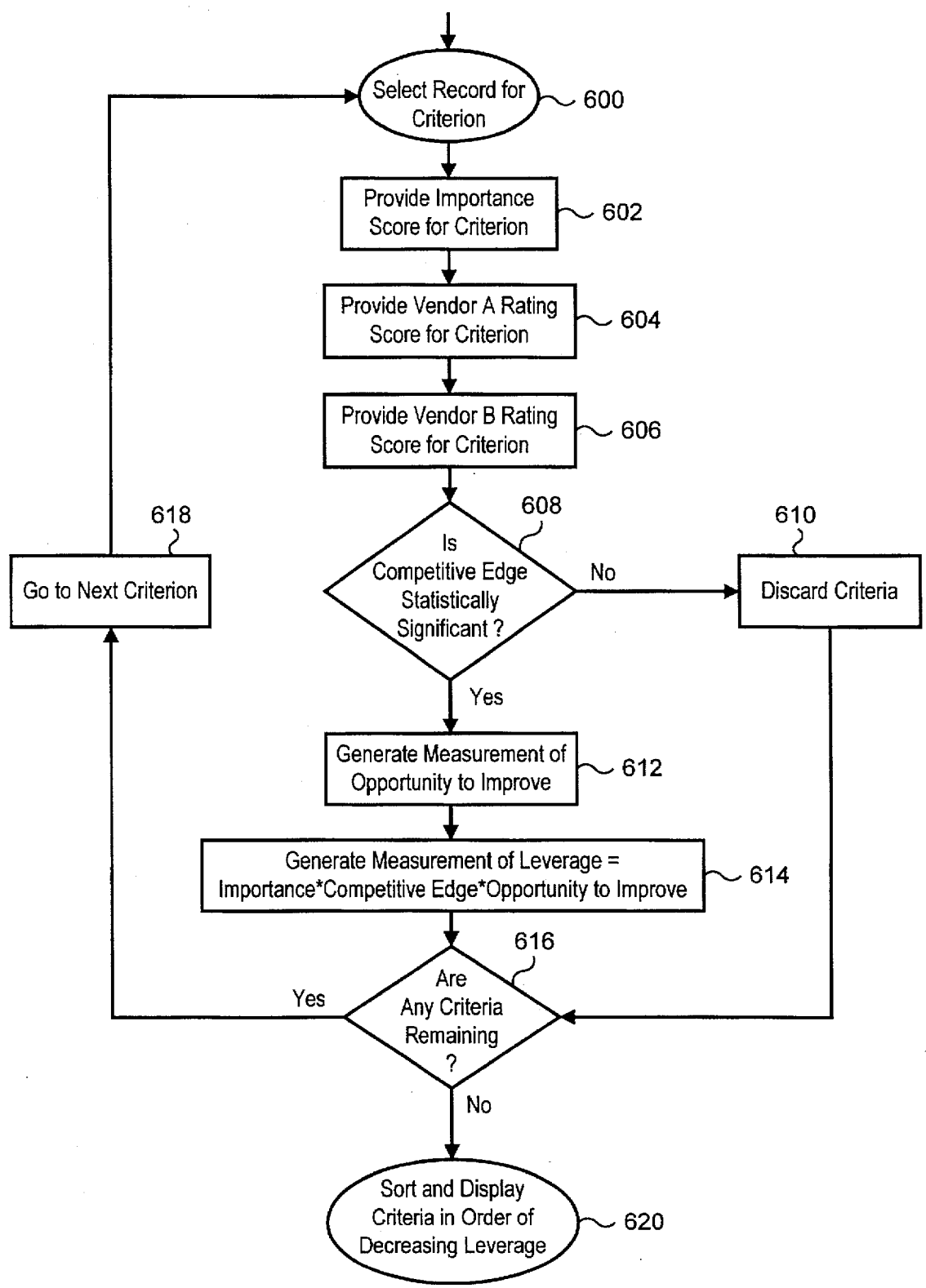
FIG. 6 is a flowchart illustrating a method for performing a distillation according to the first embodiment of the present invention.

A distillation process according to the first embodiment of the present invention is illustrated by the flowchart in FIG. 6. Distillations are performed by generating a measurement of Leverage for each of the criterion represented in a selected set of data. In performing a distillation, the programmed computer selects a criterion at 600 in FIG. 6, and retrieves the average normalized importance at 602 (hereinafter referred to as Importance), and ratings for that criterion (shown as ratings for Vendors A 604 and B 606 in FIG. 6). In the first embodiment, these values are retrieved from memory 206, or a storage device such as a disk drive or the like, and processed by the CPU 200.

Two intermediate values are then used to perform distillations: Competitive Edge and Opportunity to Improve. Competitive Edge is a measurement of the advantage in average ratings one alternative has over another. Competitive edge may be either positive or negative depending on whether the alternative is rated ahead of or behind the other alternative with which it is compared. When two overlays are selected for a Whirlwind® graphical profiles in FIG. 3, the Competitive Edge is generated and the statistical significance is calculated (see box 326). Thus, for the first embodiment, Competitive Edge does not have to be recalculated. Of course, in an embodiment where distillations are performed independently, a separate calculation would be required. Opportunity to Improve is a measurement of the amount that the rating for an alternative may improve before a perfect score is achieved for a criterion. The generation of measurements for Competitive Edge and Opportunity to Improve are illustrated in Table 4.

TABLE 4

1) Comp_Edge = rating_A − rating_B
2) Opp_Improve = perfect_rating − rating_A

As shown by equation (1) in Table 4, Competitive Edge (Comp_Edge) is the difference between average rating scores for two alternatives for a given criterion (rating_A−rating_B). The Opportunity to Improve (Opp_Improve) is the difference between a perfect rating score (perfect_score) and the average rating score for an alternative (rating_A).

After Competitive Edge is generated for each criterion, it is tested for statistical significance, as shown at 608 in FIG. 6. It will be noted that in the first embodiment, Competitive Edge and its statistical significance are calculated during the generation of the Whirlwind graphical profile, and do not have to be recalculated. In generating a distillation, the first embodiment of the present invention preferably only considers criteria where the Competitive Edge is statistically significant. Where two alternatives are statistically indistinguishable, the criterion is preferably filtered out of the analysis as shown by box 610. This simplifies the distillation and focuses the user on criteria that are likely to have affected a decision. Statistical significance is determined based on a given confidence level as is known in the art. As in the previous EMAP database, the first embodiment allows a user to select a desired confidence level for the analysis.

For those criteria where Competitive Edge is statistically significant, Opportunity to Improve is then generated at 612. Leverage is then generated for each criterion that has a statistically significant Competitive Edge at 614. Leverage is the product of Importance, Competitive Edge, and Opportunity to Improve. The product of Importance and Competitive Edge provides a measure of an alternative's comparative strengths and weaknesses. This is a measurement proportional to the likelihood that a given criterion was the deciding factor in a decision. While this provides useful information, it does not tell a vendor or other person trying to influence a decision where resources may be most effectively invested. For instance, a vendor may have a large relative strength for a criterion, but may not have much room to improve. Therefore, actions taken to improve a rating for that criterion may be wasted. A measurement of Leverage, on the other hand, incorporates Opportunity to Improve and thus tells the user not only where improvement would be helpful, but also where improvement has the most competitive impact. As illustrated by boxes 616 and 618, this process of calculating Leverage continues until no further criteria remain unprocessed for the selected set of data.

The Leverage values may be very large in some instances, so after they are all generated, the first embodiment of the present invention may divide each Leverage value by the sum of all Leverage values to generate a leverage percentage for each criterion. It will be readily apparent to one of ordinary skill in the art that in embodiments where Leverage can be negative or positive, such average should be determined by dividing by the sum of the absolute values of all Leverage values.

After leverage percentage is calculated in the first embodiment, the criteria having a statistically significant Competitive Edge are arranged in order of decreasing leverage percentage in terms of absolute value as shown at 620. In the first embodiment, this sorting is performed by CPU 200 in cooperation with memory 206. It will be understood that this sorting may be keyed directly to the absolute value of Leverage rather than the absolute value of leverage percentage, since the relative ordering does not change. However, leverage percentage allows smaller values to be maintained by the computer program.

It will be realized by those of ordinary skill in the art that Leverage and/or leverage percentage may be used to sort criteria in other useful arrangements. For instance, the signed values of Leverage and/or leverage percentage could be used instead of absolute values.

Figure 7:
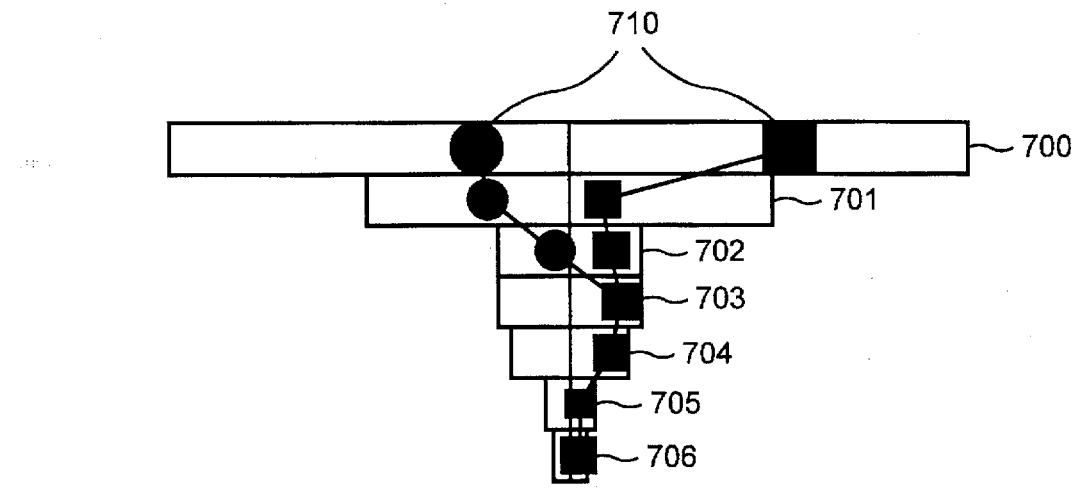
FIG. 7 is a graphical profile of a distillation according to the first embodiment of the present invention.

A Whirlwind® profile with an overlying scorecard showing average rating scores is then preferably displayed to convey the results of the distillation to the user. FIG. 7 shows a sample distillation for Vendor A's computer system compared against Vendor B's computer system. The widths of bars 700–706 are scaled according to average normalized importance of the corresponding criteria, and are arranged in order of decreasing Leverage. Bar 700, for instance, may correspond to Hardware price, and has the highest absolute value of Leverage and leverage percentage. Bar 701 may correspond to System Software price and has the next highest absolute value of Leverage. Similarly, bars 702–706 represent criteria having decreasing Leverage in terms of absolute value. The average rating scores are overlaid using marks 710 as was the case for the Whirlwind® graphical profile of FIG. 5. It will be noted that all of the marks are solid, since only criteria having a statistically significant Competitive Edge are displayed. This selection and ordering of criteria has taken the 33 criteria represented by bars 500–532 in FIG. 5 and distilled them down to seven criteria (represented by bars 700–706) that should be focused on by the user. These seven criteria were most significant to the decision makers, and the Leverage ranking gives the user a guide as to where actions are most likely to change a decision's outcome. The distillation is a prioritized list of the areas for action by a vendor where the action can have maximum impact in the mind of the buyers and therefore can increase the vendor's win rate for that group of buyers. Thus distillations can be used to determine strategy, allocate resources, and determine marketing messages among other things.

Figure 8:
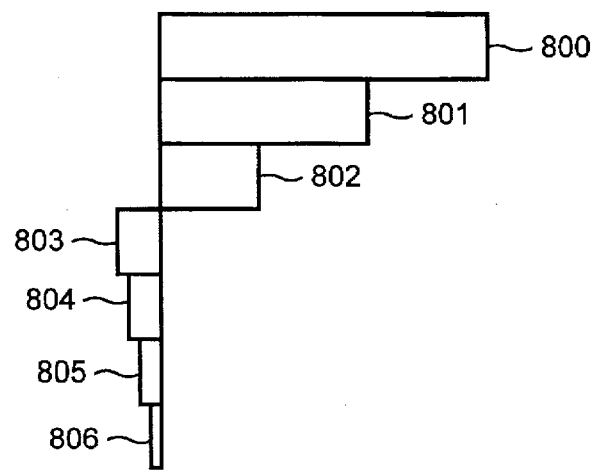
FIG. 8 is a bar chart representative of a distillation according to the first embodiment of the present invention.

FIG. 8 shows a bar chart representative of the distillation shown in FIG. 7. This is an alternative display that may be generated by the programmed computer according to the first embodiment. Each bar is representative of the leverage percentage for the criteria of FIG. 7. Positive values of leverage percentage are shown by bars 800–802 extending to the right which correspond to bars 700–702 of FIG. 7 respectively. Negative values of leverage percentage are shown by bars 803–806 extending to the left which correspond to bars 703–706 of FIG. 7 respectively. It will be noted that the bars 800–806 are arranged in order of decreasing absolute value of leverage percentage.

While the distillations described above preferably combine measurements of statistical significance, Importance, Competitive Edge, and Opportunity to Improve to provide a guide to the user, other combinations of these measurements also prove useful. For instance, when two products or services from the same vendor are compared in the first embodiment, Opportunity to Improve is preferably removed from the process. This reflects the fact that it is less useful to consider Opportunity to Improve against oneself. Rather, a modified distillation process provides the user with a focused look at the relative strengths and weaknesses of two products or services in the marketplace. In this modified distillation process, criteria are ranked based upon the product of Importance and Competitive Edge instead of using Leverage. Of course, a distillation using Opportunity to Improve could also be calculated and may be useful for a vendor trying to shift market share from one product line to another.

Figure 9A:
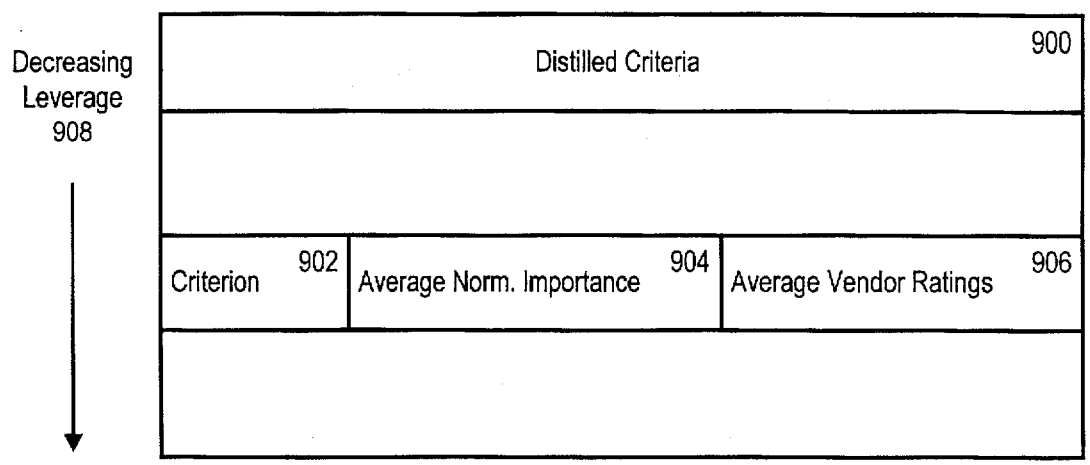
FIG. 9A is a diagram showing a first data structure that may be used for storing distilled decision table data according to an embodiment of the present invention.
Figure 9B:
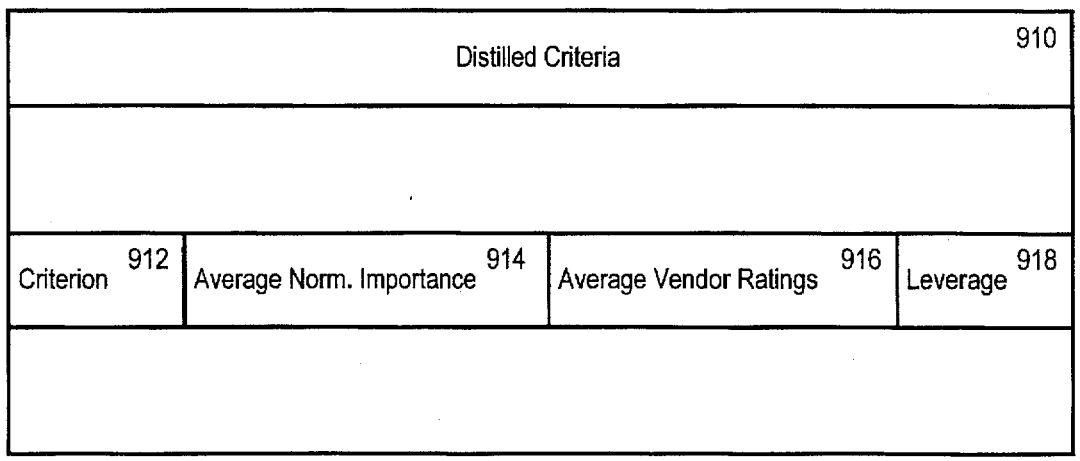
FIG. 9B is a diagram showing a second data structure that may be used for storing distilled decision table data according to an embodiment of the present invention.

In addition to displaying the results in graphical form on an output device, the results of a distillation may be stored in a data structure in memory 206 or on a storage device. A large variety of data structures may be used to associate criteria and respective values for average normalized importance and average rating scores. Two illustrative examples that may be used with certain embodiments of the present invention are illustrated in FIGS. 9A and 9B respectively. FIG. 9A shows a first table of Distilled Criteria 900 which has rows for each Criterion 902. Associated with each criterion are respective measures of Average Normalized Importance 904 and Average Vendor Ratings 906. For the data structure of FIG. 9A, the rows of criteria are sorted according to Leverage as showing by arrow 908. Leverage is not separately maintained in the table 900. FIG. 9B shows a second table of Distilled Criteria 910 with rows for each Criterion 912. Associated with each criterion are respective measures of Average Normalized Importance 914, Average Vendor Ratings 916, and Leverage 918. The rows of criteria may, but need not, be stored in sorted form. Since Leverage 918 is associated with each criterion, the criteria may be ranked according to Leverage on the fly. The data structures in FIGS. 9A and 9B provide simplified storage for data representative of a distillation. The multiple tables of data structure 308 shown in FIG. 4 may be transformed into a single table by the distillation process. This distillation data may then be output or used for further processing to help guide a user as to where the most impact on a decision may be achieved.

Figure 9C:
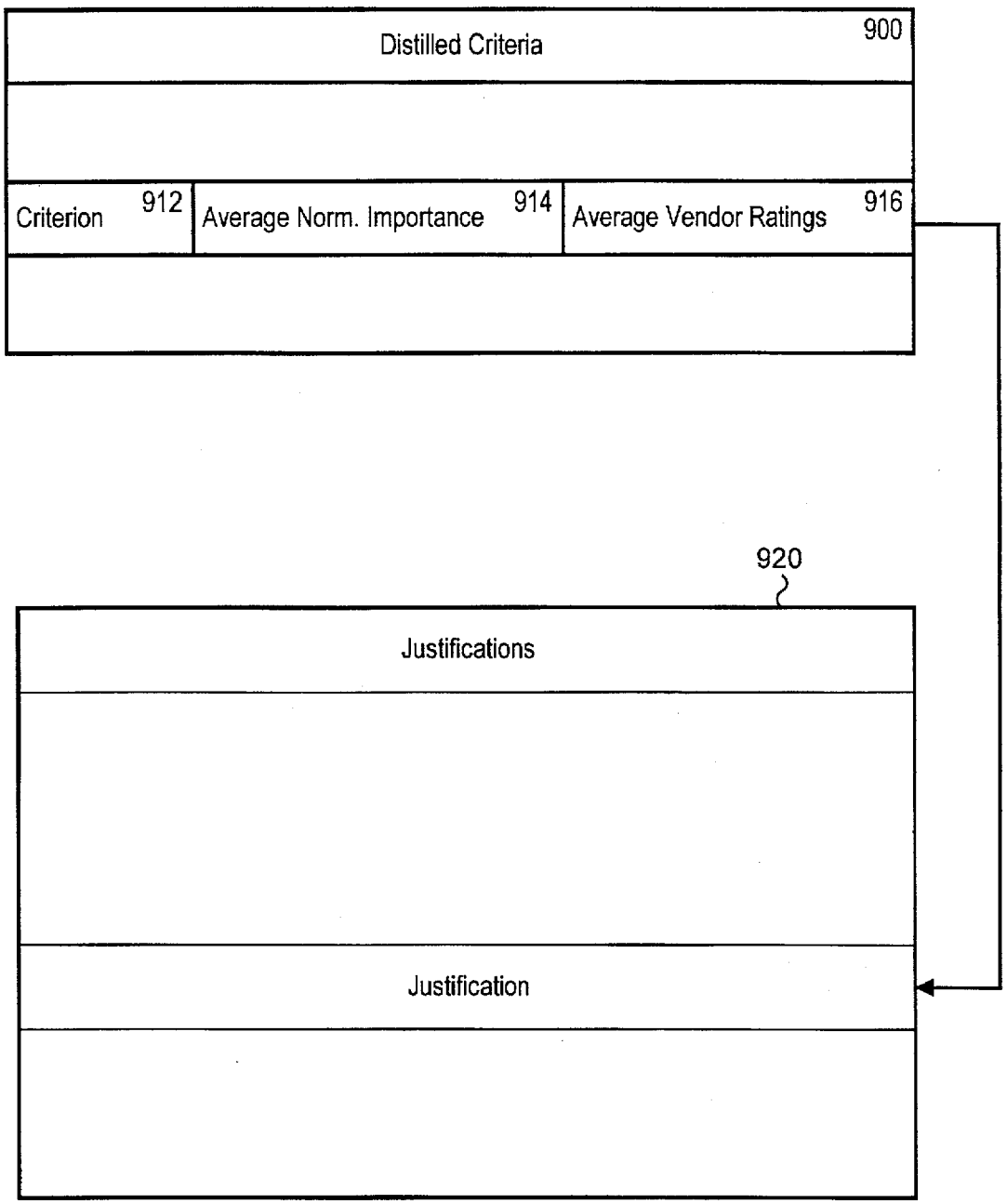
FIG. 9C is a diagram showing a third data structure that may be used for storing distilled decision table data according to an embodiment of the present invention.

In addition, as shown in FIG. 9C, buyers' justifications may be associated with the Distilled Criteria. The justifications may be stored in a separate table as shown at 920 with a separate row for each decision maker's ratings of a vendor along with the justification for that rating. This may be valuable in determining exactly what a given distillation means to a vendor. The justifications may be accessed in the order of the distilled criteria. The justifications then give guidance as to how ratings can be improved for the criteria that have the most competitive impact. Importantly, this means that comments or justifications from thousands of decision makers may be filtered and prioritized. Then an analyst can review the comments or justifications that provide guidance in areas that have the greatest competitive impact.

The foregoing description is presented to enable any person skilled in the art to make and use the invention. Descriptions of specific designs are provided only as examples. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

For instance, it will be readily apparent to those of ordinary skill in the art that aspects of the present invention may be applied in any variety of decision making and evaluation contexts. In particular, aspects of the invention may be applied to the evaluation of service providers. Customers who use a service or who are trying to decide whether to use a service may be surveyed using categories, criteria, and ratings as described above. In particular, current customers may be asked to evaluate a current service provider within a variety of categories and criteria. The importance of the criteria and the customer's evaluation for a service provider (i.e., rating) may then be used to determine leverage, distillations, etc. as described previously. Even when there is no competitive decision, the less satisfied customers may be compared to the most satisfied customers to determine which criteria will have the most impact on improving customer satisfaction. Thus, aspects of the present invention may be applied to satisfaction of existing customers as well as competitive decisions made by potential customers. Aspects of the present invention may also be applied to focus groups wherein the answers to the survey are made by consensus within the group. Distillations and related techniques described above may then be used to determine criteria that will have the most impact on the task being considered by the focus group whether it be competitive decision making, improving customer satisfaction or solving a particular problem.

Thus, while a particular embodiment of the invention has been disclosed, it will be readily apparent to those skilled in the art that numerous other modifications and variations not mentioned above can still be made without departing from the spirit and scope of the invention as claimed below.

We claim:

1. A decision tool for analyzing decisions by a plurality of decision makers among at least two alternatives based upon a plurality of criteria evaluated by the plurality of decision makers, said decision tool comprising:

a memory containing predetermined instructions and at least two data structures, a first data structure and a second data structure;

a processing unit operatively coupled to the memory and capable of executing the predetermined instructions:

an output device operatively coupled to the memory and the processing unit;

wherein for each of the criteria, each data structure associates a measure of importance for the criterion and a rating measurement for each of the alternatives representative of the evaluation by one of the plurality of decision makers, and at least one justification for each rating measurement;

wherein the processing unit executes the predetermined instructions to:

produce a combined measurement for a group of the criteria wherein the combined measurement includes a factor based upon the product of average normalized importance and competitive edge for each respective criterion in the group;

rank the respective criterion in the group based upon said combined measurement; selectively access the justifications associated with each respective criterion in the group of the criteria in accordance with the ranking of the respective criterion; and output the selected justifications on the output device.

2. An evaluation tool for analyzing customer satisfaction among at least two alternatives based upon a plurality of criteria evaluated by a plurality of customers, said evaluation tool comprising:

a memory containing predetermined instructions and at least two data structures, a first data structure and a second data structure;

a processing unit operatively coupled to the memory and capable of executing the predetermined instructions;

an output device operatively coupled to the memory and the processing unit;

wherein for each of the criteria, each data structure associates a measure of importance for the criterion and a rating measurement for each of the alternatives representative of the evaluation by one of the plurality of customers, and at least one justification for each rating measurement;

wherein the processing unit executes the predetermined instructions to:

produce a combined measurement for a group of the criteria wherein the combined measurement includes a factor based upon the product of average normalized importance and competitive edge for each respective criterion in the group;

rank the respective criterion in the group based upon said combined measurement;

selectively access the justifications associated with each respective criterion in the group of the criteria in accordance with the ranking of the respective criterion; and output the selected justifications on the output device.

3. A decision tool for analyzing decisions among at least two alternatives, a first alternative and a second alternative, wherein each decision is based upon a plurality of criteria evaluated by one of the plurality of decision makers, said decision tool comprising:

means for associating importance measurements and rating measurements representative of the evaluation by each of the decision makers, wherein for each decision maker an importance measurement is associated with each of the criteria and a rating measurement is associated with each of the criteria for each of the alternatives;

means for associating a plurality of rating justifications with each of the criteria;

means for normalizing the importance measurements for each decision maker;

means for averaging the normalized importance measurements to produce an average normalized importance for each of the criteria;

means for averaging the rating measurements to produce an average rating score associated with each of the criteria for each of the alternatives;

means for producing a combined measurement for each respective criterion wherein the combined measurement includes a factor based upon the product of the average normalized importance and competitive edge for the respective criterion;

means for ranking the criteria based upon the combined measurement for each of the criteria; and means for accessing and outputting the rating justifications based upon the rankings of the associated criteria.

4. An evaluation tool for analyzing customer satisfaction among at least two alternatives based upon a plurality of criteria evaluated by a plurality of customers, said evaluation tool comprising:

means for associating importance measurements and rating measurements representative of the evaluation by each of the customers, wherein for each customer an importance measurement is associated with each of the criteria and a rating measurement is associated with each of the criteria for each of the alternatives;

means for normalizing the importance measurements for each customer;

means for averaging the normalized importance measurements to produce an average normalized importance for each of the criteria;

means for averaging the rating measurements to produce an average rating score associated with each of the criteria for each of the alternatives;

means for producing a combined measurement for each respective criterion wherein the combined measurement includes a factor based upon the product of the average normalized importance and competitive edge for the respective criterion; and means for outputting information regarding the criteria in an order based upon the combined measurement for each respective criterion.

5. The evaluation tool of claim 4, further comprising means for associating a plurality of rating justifications with each of the criteria; and means for accessing and outputting the rating justifications based upon the combined measurement for the respective criterion.

6. The evaluation tool of claim 4, further comprising means for displaying a first graph representative of the average normalized importance for each of the criteria, wherein the ordering of the graph is based upon the combined measurement for each of the criteria; and means for displaying a second graph overlaid on the first graph, the second graph representative of the average rating score for each of the criteria.

7. The evaluation tool of claim 4, wherein said combined measurement is a measurement of leverage.

8. The evaluation tool of claim 4, wherein said means for producing the combined measurement comprises:

means for determining competitive edge of the first alternative over the second alternative for each of the criteria; and means for determining opportunity to improve for the first alternative for each of the criteria.

9. The evaluation tool of claim 8, wherein said combined measurement for each respective criterion comprises a product of the competitive edge, the opportunity to improve, and the average normalized importance for the respective criterion.

10. The evaluation tool of claim 8, further comprising means for determining whether the competitive edge for each of the criteria is statistically significant; and means for filtering the criteria based upon whether the corresponding competitive edge is statistically significant.

11. The evaluation tool of claim 4, wherein the means for outputting information regarding the criteria further comprises means for displaying a graph representative of the leverage for each of the criteria.

12. A method for analyzing decisions by a plurality of decision makers among at least two alternatives, a first alternative and a second alternative, wherein each decision is based upon a plurality of criteria evaluated by one of the plurality of decision makers, said method comprising the steps of:

associating in a memory importance measurements and rating measurements representative of the evaluation by each of the decision makers, wherein for each decision maker an importance measurement is associated with each of the criteria and a rating measurement is associated with each of the criteria for each of the alternatives;

associating in the memory a plurality of rating justifications with each of the criteria;

normalizing the importance measurements for each decision maker;

averaging the normalized importance measurements to produce an average normalized importance for each of the criteria;

averaging the rating measurements to produce an average rating score associated with each of the criteria for each of the alternatives;

producing a combined measurement for each respective criterion wherein the combined measurement includes a factor based upon a product of the average normalized importance and competitive edge for the respective criterion;

ranking the criteria based upon the combined measurement for each of the criteria; and accessing and outputting the rating justifications from the memory based upon the rankings of the associated criteria.

13. A method for analyzing customer satisfaction among at least two alternatives based upon a plurality of criteria evaluated by a plurality of customers, said method comprising the steps of:

associating in a memory importance measurements and rating measurements representative of the evaluation by each of the customers, wherein for each customer an importance measurement is associated with each of the criteria and a rating measurement is associated with each of the criteria for each of the alternatives;

normalizing the importance measurements for each customer;

averaging the normalized importance measurements to produce an average normalized importance for each of the criteria;

averaging the rating measurements to produce an average rating score associated with each of the criteria for each of the alternatives;

producing a combined measurement for each respective criterion wherein the combined measurement includes a factor based upon a product of the average normalized importance and competitive edge for the respective criterion; and outputting information regarding the criteria in an order based upon the combined measurement for each respective criterion.

14. The method of claim 13, further comprising the steps of associating in the memory a plurality of rating justifications with each of the criteria; and accessing and outputting the rating justifications from the memory based upon the combined measurement for the respective associated criterion.

15. The method of claim 13, further comprising the steps of displaying a first graph representative of the average normalized importance for each of the criteria, wherein the ordering of the graph is based upon the combined measurement for each of the criteria; and displaying a second graph overlaid on the first graph, the second graph representative of the average rating score for each of the criteria.

16. The method of claim 13, wherein said combined measurement is a measurement of leverage.

17. The method of claim 13, wherein the step of producing the combined measurement further comprises the steps of:

determining competitive edge of the first alternative over the second alternative for each of the criteria; and determining opportunity to improve for the first alternative for each of the criteria.

18. The method of claim 17, wherein said combined measurement for each respective criterion comprises a product of the competitive edge, the opportunity to improve, and the average normalized importance for the respective criterion.

19. The method of claim 17, further comprising the steps of determining whether the competitive edge for each of the criteria is statistically significant; and filtering the criteria based upon whether the corresponding competitive edge is statistically significant.

20. The method of claim 13, wherein the step of outputting information regarding the criteria further comprises the step of displaying a graph representative of the leverage for each of the criteria.

* * * * *